July 4, 1961

G. F. CLARKE 2,991,467

PULSE RADAR SYSTEM FOR AUTOMATICALLY
TRACKING A SELECTED MOVING TARGET

Filed May 3, 1955

Inventor
George Farren Clarke
By
Harry M. Saragovitz
Attorney

United States Patent Office 2,991,467
Patented July 4, 1961

2,991,467
PULSE RADAR SYSTEM FOR AUTOMATICALLY TRACKING A SELECTED MOVING TARGET
George Farren Clarke, Monks Hangar, Farnham, England, assignor to the Minister of Supply in Her Majesty's Government of the United Kingdom of Great Britain and Northern Ireland, London, England
Filed May 3, 1955, Ser. No. 505,703
Claims priority, application Great Britain May 3, 1954
2 Claims. (Cl. 343—13)

The present invention relates to radio apparatus for detecting the presence of objects such as aircraft.

The radio apparatus of the present invention is of the kind which transmits radio-frequency energy into space and detects the radio-frequency energy reflected by the object back to the apparatus. The reflected energy is made to control electrical or mechanical means for causing the apparatus to follow signals from a single chosen target in preference to the signals from other targets and noise. It is usual to achieve discrimination in angle by the servo control of the direction of a beamed aerial system. Further discrimination is usually achieved in range by generating delayed pulses to operate time-gates or strobes to be open only at the instants when wanted reflected pulses are expected. Alternatively, or additionally, further discrimination is achieved in velocity by using continuous waves or coherent pulses and arranging that a narrow band filter excludes all signals excepting those having the same doppler shift as the wanted target.

In such systems the pulse recurrence frequency has hitherto been limited by two factors. Firstly, the inability of the time-measuring devices used to distinguish between reflected radio-frequency energy from one pulse and that from another. Thus if the range of the reflecting object is such that the time elapsing between transmission and reception of the same pulse of radio frequency energy is greater than the time elapsing between each successive transmitted pulse of radio-frequency energy, ambiguity in range discrimination and determination results. Secondly, in the case of velocity discrimination, unless the pulse recurrence frequency is made greater than twice the maximum possible doppler shift, ambiguous velocity response will result. On the higher microwave carrier frequencies it frequently is the case that there is no range of recurrence frequencies free of both of these objections and it is then usual to abandon either range or velocity discrimination.

According to the present invention there is provided radio apparatus for detecting the presence of reflecting objects comprising a transmitter for transmitting pulse modulated radio-frequency energy, a receiver for receiving any radio-frequency energy reflected by an object in the path of the radio-frequency energy transmitted by the transmitter, a variable delay unit for delaying signals derived from the transmitter and means for correlating the delayed signals and signals derived from the receiver to obtain a signal giving of the sense and magnitude of the difference in time of the occurrence of the delayed signals derived from the transmitter and the signals derived from the receiver.

According to a feature of the present invention there is provided radio apparatus for detecting the presence of reflecting objects and comprising a transmitter for transmitting radio-frequency energy modulated by a pulse series in which the intervals of time between the pulses are made irregular in order to give the transmitted signal in some measure the characteristics of random noise, a receiver arranged to receive any pulses of radio-frequency energy reflected by an object in the path of the radio-frequency energy transmitted by the transmitter, means connected to the transmitter for deriving from the transmitter delayed reference pulses and means for correlating the delayed reference pulses with signals derived from the receiver so as to obtain a signal giving of the sense and magnitude of the time difference between the occurrence of the delayed reference pulses and the signals derived from the receiver. The pulse series employed for modulating the transmitter does not, therefore, have a uniform pulse recurrence frequency but the mean recurrence frequency may be high whilst at the same time the possibility of range ambiguity is much reduced.

In order that the present invention may be more easily understood embodiments thereof will now be described, by way of example, with reference to the accompanying drawings, in which.

Figure 1:
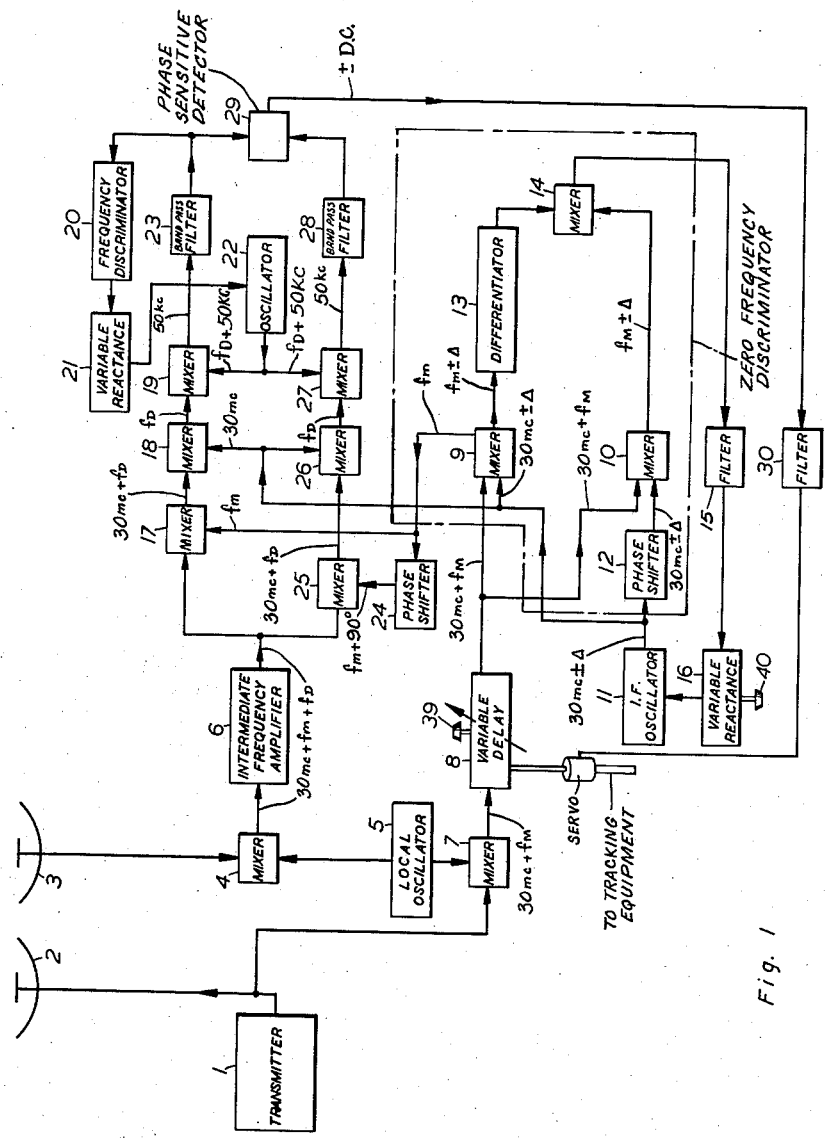
FIGURE 1 is a circuit diagram of a pulsed radio range and velocity tracking apparatus.
Figure 3:
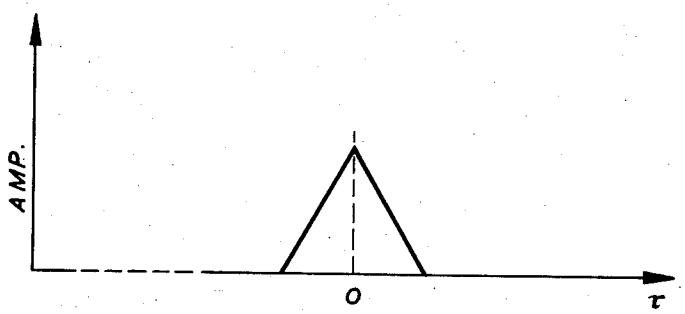
FIGURE 3 is a graphical representation of a range discrimination characteristic suitable for apparatus shown in FIGURE 1.

FIGURE 1 shows a transmitter 1 which is arranged to generate a continuous wave signal of radio frequency energy having a spectral power distribution such as will result in the required range discrimination function illustrated in FIGURE 3. It may be shown that this spectral power distribution is approximately that, which, when transferred to a zero-frequency carrier or center frequency, is the fourier transform of the range discrimination function. Such a spectral power distribution may be obtained by modulating a carrier wave in amplitude or frequency in such a manner that symmetrical sidebands of the required power are produced. The signal is passed to a transmitter aerial 2 and signals reflected from external objects are received in a receiving aerial 3. The aerials may be of the type which have narrow beam polar diagrams in order to exclude signals from objects not in the direction of the beam. Such aerials are normally provided with means for directing these beams in the direction of the wanted target. These circuits are not shown in FIGURE 1 as such additions may be made using known methods.

The received signals are passed to a mixer 4 which is also fed with oscillations from a substantially stable local oscillator 5. A wide band filter (not shown) passes and a subsequent intermediate-frequency amplifier 6 amplifies, the difference frequency signal. The difference frequency is chosen as one suited to the design of the wide band filter called for to pass the whole of the signal. It may, for example, be of the order of 30 mc./s.

A small portion of the signal from the transmitter 1 is bled off and fed to a second mixer 7 which is also fed from the output of the stable local oscillator 5. The difference frequency output of the mixer 7 is fed to a variable delay unit 8 which may, for instance, consist of a medium for the propagation of ultrasonic waves between two transducers of variable spacing. Amplifiers (not shown) are included, where necessary, to compensate for the attenuation in this unit. The variable delay unit 8 may, for example, comprise a nickel wire having two magnetostrictive transducers thereon. One transducer may be stationary on the wire while the other is movable along the wire to vary its distance from the stationary transducer. Variation of this distance will vary the time taken by the ultrasonic signal in travelling between the two transducers. Alternatively, a mercury delay line having two piezo-electric crystals variably spaced in the mercury may be used.

The delayed pulse signals from the variable delay unit 8 are taken to two mixers 9 and 10 in which they are mixed with the output from steady state oscillator 11 in mixer 9 and with this same output in mixer 10 but changed in phase by 90° in a phase-shifting unit 12. The output of the mixer 9 consists of the original pulse modulation $f_M$ (as imposed on the transmitted signal) but now imposed on a low frequency carrier $\Delta$ which has a frequency equal to the difference between the frequency of the oscillator 11 (30 mc.+$\Delta$) and the intermediate-frequency 30 mc. This pulse modulated low frequency carrier signal is then applied to a differentiating unit 13, which by its nature gives to all frequency components a phase advance which is near 90° and an amplitude which is proportional to frequency. The output from the mixer 10 is similar to that from the differentiating unit 13, but without the dependence of amplitude upon frequency. The output from the mixer 10 may be in phase with, or in phase opposition to, the output from the differentiating unit 13, depending on whether the frequency of the output from the oscillator 11 is greater or less than the principal spectral components of the output of the delay unit 8.

Combining these two outputs in a mixer 14 then produces a direct current component proportional to the frequency difference between the output of the oscillator 11 and the centre-frequency of the output from the delay unit 8 and having a sign which is dependent on the sense of the frequency difference. The mixers 9 and 10, the phase shifter 12, the differentiator 13 and the mixer 14 may be regarded as a zero-frequency discriminator which gives no output from the mixer 14 when the centre-frequency of the output of the delay unit 8 and the frequency of the oscillator 11 are equal. The output of the mixer 14 may, therefore, be connected through a servo stabilising filter 15 to a voltage-controlled reactance tube 16 connected to the oscillator 11, and will operate to maintain the frequency of this oscillator at, or very near, the centre-frequency of the reference wave output from the delay unit 8. The output from the mixer 9 is then the delayed original modulation $f_M$ (imposed on a very low frequency carrier if the oscillator frequency and the centre frequency of the reference wave are not identical) and may be used for the modulation reference $f_M$, while the output from the oscillator 11 may be used as the carrier reference.

Figure 2:
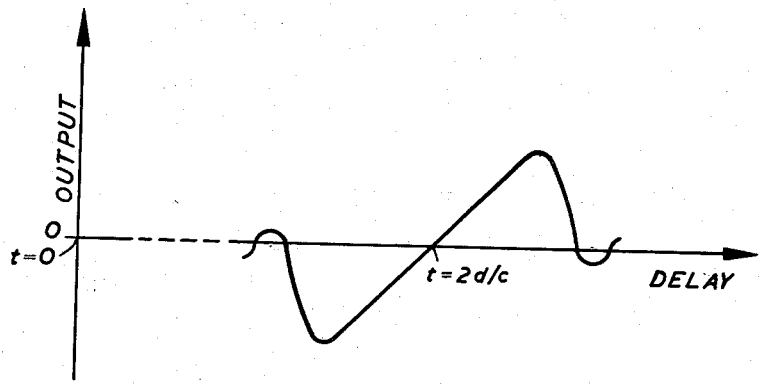
FIGURE 2 is a graph explanatory of the function of part of the circuit shown in FIGURE 1.

The output from the intermediate-frequency amplifier 6 is divided into two channels which are referred to hereinafter as the correlation reference channel and the misalignment reference channel. The signal in the correlation reference channel is fed to a mixer 17 which includes a band-pass filter and there cross-correlated with the modulation reference signal $f_M$ from the mixer 9 resulting in a substantially monochromatic or sideband free signal at or near the intermediate frequency. By mixing this signal in a mixer 18 with the carrier reference frequency from the oscillator 11, the 30 mc. carrier is eliminated, retaining only the doppler frequency signal received from the moving target which is then filtered in a low-pass 0 ± 20 k.c./s. filter (not shown). The doppler frequency signal is then converted to a fixed frequency, say 50 k.c./s., determined by a frequency discriminator 20 controlling oscillator 22, through reactance tube 21. A band-pass filter 23, having a pass band of say 50 k.c./s. ± 50 cycles per second, filters the signal from the mixer 19 and accepts the signal due to a chosen target, the target having been selected in a manner to be described hereinafter. Once the signal due to the chosen target has been accepted by the filter 23, however the target velocity may vary the target signal power is directed into a band-pass filter 23. The misalignment reference channel is similar to the correlation reference channel except that the cross-correlation is with a signal obtained by passing the modulation reference signal $f_M$ through a 90° all pass phase-shifter 24 to a mixer 25. The frequency changes in the two mixers 26 and 27 and the filtering in a band-pass filter 28 provides a signal of frequency equal to that in the filter 23 but having an amplitude proportional to the difference between the delay imposed in the delay unit 8 and the propagation-retardation in the journey to and from the target. This signal from the output of the filter 28 has a phase, relative to the phase of the signal from the output of the filter 23 which determines the sign of this difference. When these waves are then combined in phase-sensitive detector 29 they provide a reversible direct current signal which, when modified by a servo stabilising network 30, provides a controlling function (as illustrated in FIGURE 2) suitable for controlling the motor driving the variable delay unit 8. The servo, in addition to controlling variable delay device 8, could be utilized to control the necessary tracking equipment in a well known manner. This system once set on a selected target will maintain the difference in the times of occurrence of the delayed signals from the delay unit 8 and the received signals at a small value and hence ensure that the cross-correlation in mixer 17 is maintained at an efficient level.

FIGURE 2 shows the variation of the output of the phase-sensitive detector 29 plotted against the time of occurrence of the delayed signals, which, in this embodiment, is the delay imposed upon the transmitter signal by the delay unit 8. It will be seen that the output of the detector 29 passes through zero when the time delay $\tau$ of the transmitter pulse equals $2\,d/c$ where $d$ is the distance of the reflecting object from the apparatus and $c$ is the velocity of light (that is to say, the output of the detector 29 passes through zero when the wanted signal and the reference signal are coincident).

In operation, the apparatus may be put on target after the approximate range and velocity of the target has already been determined by ancillary apparatus. The range thus determined is then set in to the variable delay unit 8 by means of a control 39 so that the transmitter pulse delay $\tau$ is approximately equal to the range delay $2\,d/c$. The apparatus may be accommodated to the velocity of the target by means of a control 40 on the variable reactance tube 16. This control serves to adjust slightly the frequency of the oscillator 11 so that the doppler shift frequency $f_M$ is counteracted and the filter 23 accepts the signal due to the target. Once this signal has been accepted by filter 23, the discriminator 20 and reactance tube 21 will, of course, maintain the frequency of the oscillator 22 in correct adjustment for the filter 23 to accept the signal.

Alternatively, the variable delay unit 8 and the variable reactance tube 16 may be swept at different speeds through their ranges of adjustment in known manners, until a target has been located.

The choice of the modulation of the radio-frequency energy transmitted by the transmitter and of other important factors affecting the design of the apparatus is made in the light of the following considerations. A suitable discrimination function, which may, for example, be triangular between narrow limits and zero outside these triangular limits, is decided upon. Such a triangular discrimination function is illustrated in FIGURE 3. FIGURE 3 shows a graph in which the abscissa represents the time of occurrence of the delayed signals, for example the time delay $\tau$ introduced by the delay unit 8, measured with respect to the time of reception of the wanted signal and the ordinate represents the magnitude of the response from the apparatus after correlation has occurred. The fourier transform of this triangular function is determined in order to obtain the spectral density distribution of the modulation of the transmitted signal.

Figure 4:
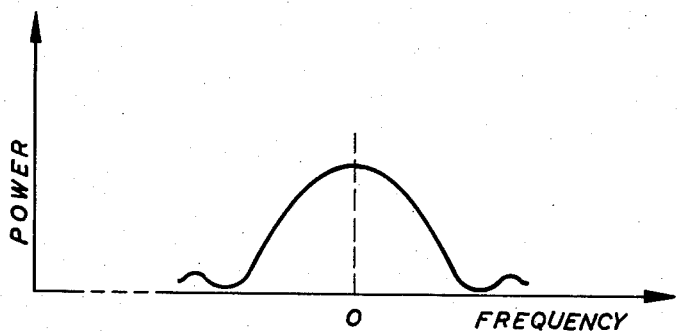
FIGURE 4 is a graphical representation of the power spectrum of the modulation used in the apparatus shown in FIGURE 1.

The fourier transform of the discrimination function of FIGURE 3 is illustrated in FIGURE 4. FIGURE 4 shows, in fact, the corresponding spectral density distribution required for the transmitter signal modulation, the abscissa representing frequency and the ordinate representing the power output. It is to be noted that with some discrimination functions, for instance a rectangular function, the transform calls for negative power densities in some parts of the spectrum, and some characteristics are impossible in systems in which the reference wave and signal are identical. They may however be achieved by the use of an unequal reference wave such that the product-spectrum, which may of course have negative regions, conforms with the required transform.

Figure 5:
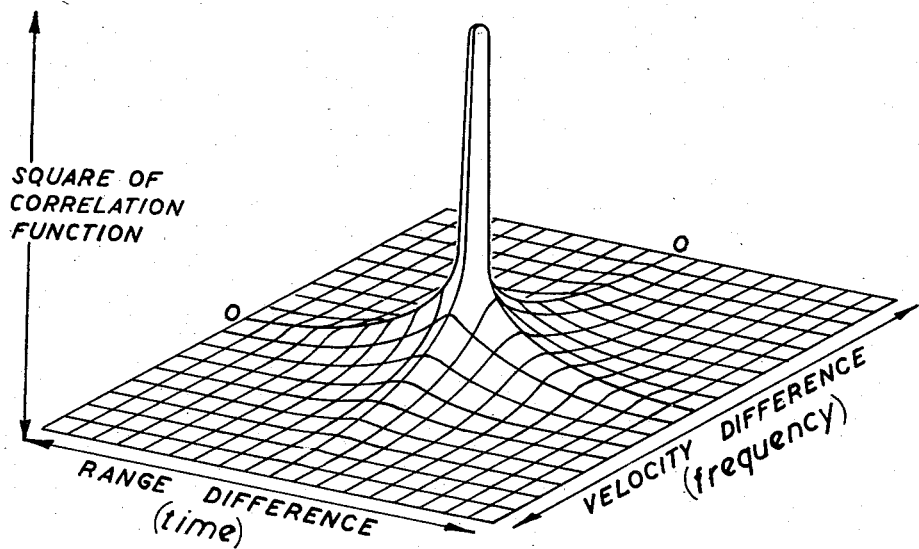
FIGURE 5 is a graph demonstrating the discriminating properties of pure noise.

If now a suitable velocity and hence frequency discrimination function, is decided upon, its fourier transform specifies the distribution in time of the power in the samples integrated. Provided that the signal is one sensibly continuous in time, this will be determined by the integrating band-pass filter circuits 23 and 28, and the result is approximately achieved by designing these filters to have a pass-band corresponding to the required discrimination. In a system aiming at good velocity and range discrimination a limit on the general discrimination level at large range and velocity displacements arises. This is fundamental and does not prevent a valuable increase of discrimination being achieved by these methods. FIGURE 5 illustrates the range-velocity discrimination characteristic which may theoretically be achieved by these methods.

FIGURE 5 is a three-dimensional graphical diagram in which the range difference (that is to say, the time difference between $2 d/c$ and $\tau$) and the velocity difference (that is to say, the frequency difference between the delayed signals and received signals due to the doppler effect) are plotted against the square of the correlation function representing the theoretical response of the apparatus.

It will be realised that the above-described embodiment illustrates only one method of generating delayed correlation reference waves and misalignment reference waves. Many other arrangements using modulation frequency delay units instead of the intermediate or difference frequency delay unit, 8, and using other methods of generating a suitable misalignment reference wave, such as the use of a differentiator, will occur to those versed in the art.

In some cases it is desired to have unambiguous range and velocity discrimination and at the same time preserve the very high discrimination against the transmitter itself which is obtainable in a pulsed system. This may be done by the use of a modulation consisting of a series of discrete pulses of which the interpulse intervals are made substantially random in length in a way and in such measure as to give the wave many of the properties of pure noise. In this case, the receiver is switched off when the transmitter is sending. In effect decorrelation is made against the transmitter signal and this leaves sufficient gaps for the correlation of the wanted signal not be to seriously affected.

Figure 6:
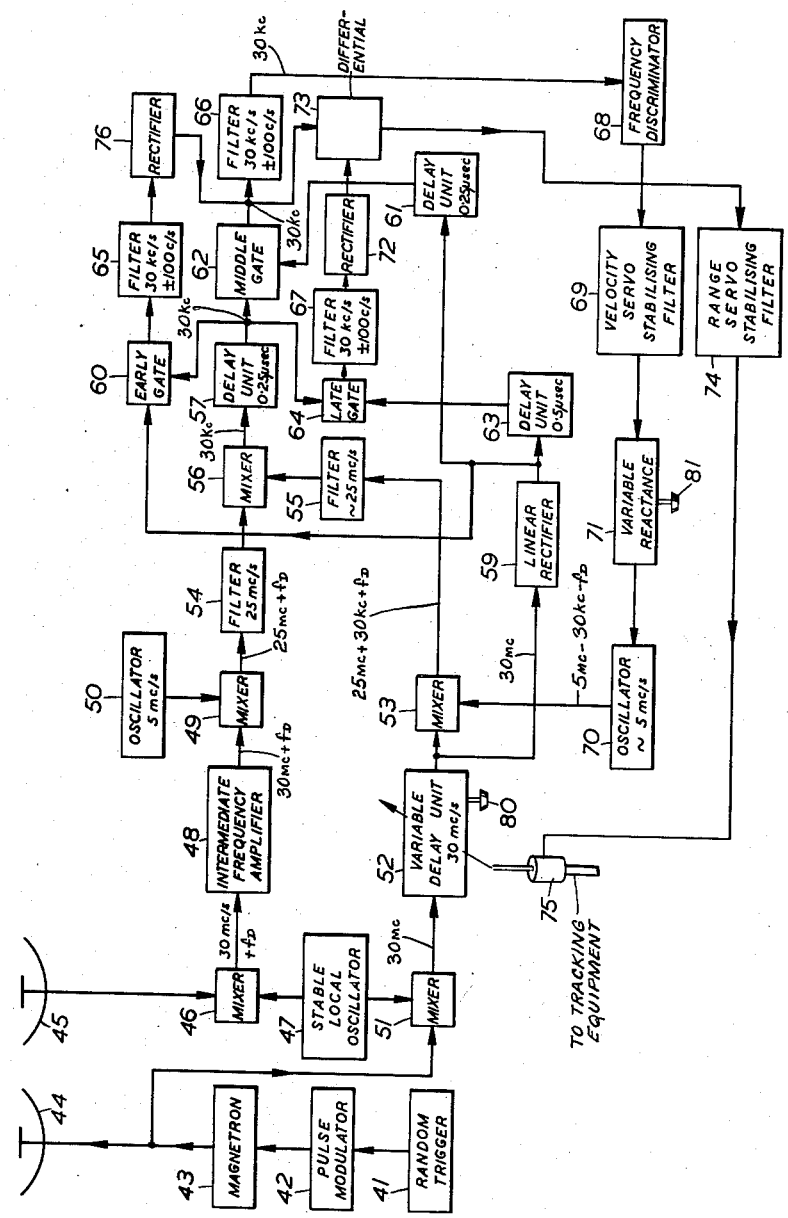
FIGURE 6 is a circuit diagram of a pulsed radio range and velocity tracking apparatus.

FIGURE 6 shows a block schematic diagram of a system employing the random-pulsed modulation method. A random trigger unit 41 operates a pulse modulator 42 which is then applied, for instance, to a magnetron oscillator 43 resulting in a series of "random" pulses which are radiated by an aerial 44. Reflected radio-frequency energy received in an aerial 45 is taken to a mixer 46 to be changed in frequency by heterodyne with the output from a substantially stable local oscillator 47. The resultant difference frequency signal 30 mc./s. is filtered and amplified in an intermediate frequency amplifier 48. The signal is then subjected to a further frequency change by mixing in a mixer 49 with the 5 mc./s. output from a fixed frequency oscillator 50. The purpose of this frequency change is to match approximately a similar change which takes place in a part of the circuit to be described hereinafter.

Part of the transmitter power is bled from the magnetron 43 and its centre-frequency is changed by mixing it in a mixer 51 with the output of the local oscillator 47. The resultant intermediate or difference frequency signal 30 mc./s. is then delayed in a variable delay unit 52 and applied to a mixer 53 which again shifts the frequency. (The variable delay unit 52 may be similar in form to the delay unit 8 described with reference to FIGURE 1.) The frequency shift in the mixer 53 is so arranged that it brings the centre-frequency of the signal to a frequency differing from that at the output of the mixer 49 by an amount suited to the design of an effective band-pass filter (that is, the filters 65, 66 or 67 to be described hereinafter) having a width of pass-band Δ corresponding to the velocity discrimination desired. Thus, if the output of the mixer 49 is, for example, 25 mc./s. plus the doppler shift frequency, the output of the mixer 53 is arranged, for example to be 25 mc./s. plus, for example, 30 kc./s. plus the doppler shift frequency. This is carried out by suitable adjustment of the frequency of the oscillator 70 in a manner to be described hereinafter.

The outputs of the mixers 49 and 53 are filtered in filters 54 and 55 respectively and then mixed in a mixer 56. The resultant correlated wave is then delayed by a small fixed amount (in a delay unit 57) equal to about half of the range discrimination width (that is to say, about half the pulse width), and then passed to three separate gating circuits 60, 62 and 64 designated the early gate, the middle gate and the late gate respectively. The 30 mc./s. output from the variable delay unit 52 is also taken to a linear rectifier 59 to generate D.C. video pulses which operate the early gate 60 thereby providing one gated version of the output of the delay unit 57. The video pulses are also (after being delayed by a small amount, say .25 μsec. in a delay unit 61) made to pass through the middle gate 62. The video pulses are also delayed in a delay unit 63 by twice the amount of the delay in the delay unit 61 and made to operate the late gate 64. All three gated signals are integrated in filters 65, 66 and 67, which are similar to one another. There are now three gated versions of the signal integrated in filters so that the pulse form has disappeared. The signal, from the middle gate filter 66, will usually be the greater in amplitude, for the early and late gates will normally embrace only half the signal. The output from the filter 66 is passed to a frequency discriminator 68 from which, after application to the stabilising filter 69, is derived a frequency (or velocity) misalignment voltage to control the frequency of an oscillator 70, through a controlled reactance tube 71. The frequency of the oscillator 70 is thus controlled to a value resulting in the difference frequency from the mixer 56 always being in the centre of the filters (65, 66 and 67) passband even in the presence of variations of doppler shift arising from changing components of target velocity.

The filtered output from the filters 65 and 67 are both subjected to linear rectification in rectifiers 76 and 72 respectively, giving direct current (or direct voltage) signals which are balanced against each other in an electric differential 73. This differential merely subtracts the voltages or currents one from another in known manner. The output from the differential 73 is then sensibly proportional to the temporary misalignment between the received signals and reference pulses and may be passed through a stabilising filter 74 for the continuous control through a servomotor 75 of the delay unit 52, so that once put on in velocity and range the equipment will track the chosen target in these two co-ordinates.

In operation, the apparatus may be initially put on target after the approximate range and velocity of the target has already been determined by means of ancillary apparatus. The range thus determined is then set in to the variable delay unit 52 by means of a control 80 so that the delay is approximately equal to that due to the radio-frequency energy travelling from the transmitter to the target and back to the receiver. The velocity of the target is compensated for by adjusting the variable reactance tube circuit 71 by means of a control 81. The frequency of the oscillator 70 is thereby adjusted to compensate for the doppler frequency shift due to the movement of the target. Once the controls 80 and 81 are properly adjusted the variable delay unit 52 and the variable reactance 71 are controlled as hereinbefore described.

Alternatively, the variable delay unit 52 and the variable reactance 71 may be swept at different speeds through their ranges of adjustment until a target has been located.

The system exemplified in FIGURE 1 may make use of a wide variety of wave-forms. If the radar is one sometimes termed "multistatic" or "semiactive" in which the transmitter and receiver are spaced apart, interference between the transmitter and receiver may not be a special problem. In these cases the waveform of the transmitted signal may be obtained by the use of amplitude modulation or frequency modulation of a carrier with pure noise or a sufficient combination of enharmonic sinusoids to give an adequate simulation of pure noise. In other cases in which the receiver is required to reject direct reception from the transmitter, pulses are preferred but the mean power may be maintained at a high level by using a high mean recurrence of short pulses distributed in time in substantially random-like fashion, or the combination of longer pulses distributed in frequency and time in order to obtain wide-band spectra with a not too low duty cycle (that is to say, with a ratio of pulse length to the mean interval between pulses which is not too low).

I claim:

1. A pulse-echo object locating system for automatically tracking a selected moving target in range which includes; a radio frequency pulse transmitter, a receiver responsive to reflected pulse signals, a correlation reference channel, and a misalignment reference channel connected to the intermediate frequency output of the receiver, a variable delay unit for delaying pulse signals derived from the transmitter, a steady state reference frequency oscillator, a mixer combining the reference frequency and the output signals from the variable delay unit deriving therefrom a substantially carrier free signal retaining only the modulation components of the transmitted pulses, a substantially carrier free discriminator including said modulation components mixer centered on the intermediate frequency for controlling the reference frequency oscillator, a first mixer in the correlation reference channel and in the misalignment reference channel connected to the receiver, a connection from the output of said modulation components mixer to the mixer in the correlation channel for eliminating the modulation components from the received signal, means for deriving a signal having an amplitude proportional to the difference between the delay in the variable delay unit and the delay in propagating the echo signal which includes a 90 degree phase shifter, a connection to the output of the mixer producing said carrier free signal and a connection from the output of the 90 degree phase shifter to the first mixer in the misalignment channel for eliminating the modulation components from said channel, second mixers in the correlation and misalignment channels respectively connected to the reference oscillator for eliminating the intermediate frequency from said channels retaining therein only the doppler components of the received signals, third mixers in both channels, means for converting the doppler frequencies of both channels to a higher predetermined frequency including an oscillator connected to said third mixers and controlled by a discriminator connected to the output of the correlation channel, a narrow pass-band filter in the output of each channel to pass said higher predetermined frequency, and a phase sensitive detector connected to the output of both channels for providing a reversible direct current signal responsive to the signals in said channels for controlling said variable delay unit, whereby the system once set on a selected moving target the variable delay unit will thereafter automatically match the time delay of the received echo signal.

2. Radio apparatus for detecting the presence of moving reflecting objects and automatically tracking the same comprising, a transmitter for directionally transmitting pulse modulated radio energy, a receiver for receiving radio energy reflected by an object in the path of said energy, a variable delay unit for delaying signals derived from the transmitter, a correlating reference channel in which the delayed signals from the transmitter are mixed with signals from the receiver, phase shifting means for shifting the phase of signals derived from the variable delay unit by 90 degrees, a misalignment reference channel in which the signals from the receiver are mixed with signals from the phase-shifting means, means for substantially removing the center-frequency of the signals in the correlation and misalignment reference channels retaining therein only the doppler components of the received signals including an oscillator, a zero frequency discriminator connected to the output of the variable delay unit and to said oscillator, a variable reactance tube circuit connected to the output of said zero frequency discriminator and to said oscillator to maintain the frequency thereof substantially at the center frequency of the output from the variable delay unit, and a mixer in each of said channels connected to the output of said oscillator, oscillator means for converting the doppler frequency of each channel to a higher predetermined frequency including a mixer connected in each channel, a sinusoidal oscillator connected to each mixer, a frequency discriminator connected to the output of the correlation reference channel, a variable reactance tube circuit connected to the output of the frequency discriminator and to the oscillator for controlling the frequency thereof, whereby the frequency of the correlation and misalignment channels is maintained at a fixed value, a narrow pass-band filter in each channel providing a sharp velocity discrimination of the signals in the channels, and a phase sensitive detector arranged to combine the filtered outputs of the correlation and misalignment channels and produce thereby a reversible direct current signal for controlling said variable delay unit so that the delayed signals from the transmitter will be maintained in coincidence with signals from the receiver automatically while tracking a moving target.

References Cited in the file of this patent

UNITED STATES PATENTS

| | | |
|---|---|---|
| 2,517,549 | Earp | Aug. 8, 1950 |
| 2,688,743 | Berger | Sept. 7, 1954 |
| 2,717,377 | Tasker | Sept. 6, 1955 |
| 2,776,425 | Altman | Jan. 1, 1957 |